(12) United States Patent
Mishra et al.

(10) Patent No.: US 8,254,366 B2
(45) Date of Patent: *Aug. 28, 2012

(54) WIRELESS MAC LAYER THROUGHPUT IMPROVEMENTS

(75) Inventors: Partho P. Mishra, Cupertino, CA (US); Sandesh Goel, Moutain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/554,618

(22) Filed: Sep. 4, 2009

(65) Prior Publication Data

US 2009/0323594 A1    Dec. 31, 2009

Related U.S. Application Data

(63) Continuation of application No. 10/917,595, filed on Aug. 12, 2004, now Pat. No. 7,606,213.

(51) Int. Cl.
*H04J 3/24* (2006.01)

(52) U.S. Cl. ........ 370/349; 370/338; 370/328; 370/445; 370/447; 714/748; 714/749

(58) Field of Classification Search .................. 370/349, 370/328, 445, 447, 410, 428, 468, 473, 477, 370/903, 236, 235, 252–253, 474, 338; 714/748, 714/749

See application file for complete search history.

(56) References Cited

U.S. PATENT DOCUMENTS

| | | |
|---|---|---|
| 7,551,581 B2 | 6/2009 | Stephens et al. |
| 7,606,213 B2 * | 10/2009 | Mishra et al. ................. 370/349 |
| 2005/0068895 A1 * | 3/2005 | Stephens et al. ............. 370/235 |

* cited by examiner

*Primary Examiner* — Kamran Afshar
*Assistant Examiner* — Sayed T Zewari
(74) *Attorney, Agent, or Firm* — Kenyon Jenckes; Howard H. Seo (57) ABSTRACT

Methods, apparatuses, and systems are presented for transmitting data packets in a wireless network over a multi-access channel involving sequentially sending a plurality of medium access control (MAC) data packets from a transmitter over the multi-access channel, using a physical layer protocol based on a standard physical layer protocol having a short interframe spacing (SIFS), wherein the plurality of MAC data packets includes at least a first data packet and a second data packet separated by a reduced interframe spacing that is less than SIFS, attempting to receive the plurality of MAC data packets at a receiver using the physical layer protocol, including the first data packet and the second data packet separated by the reduced interframe spacing, and sending from the receiver a single acknowledgement packet associated with attempting to receive the plurality of MAC data packets.

24 Claims, 7 Drawing Sheets

QUEUE STATE BEFORE TRANSMISSION
BEGINS (TOTAL OF 5 PACKETS)

QUEUE STATE AFTER P1 AND P2 HAVE
BEEN TRANSMITTED BUT NOT ACKed

QUEUE STATE AFTER P1 AND P2 HAVE
BEEN SUCCESSFULLY ACKed

WIRELESS MAC LAYER THROUGHPUT IMPROVEMENTS

CLAIM FOR PRIORITY UNDER 35 U.S.C. §120

The present application for patent is a continuation of patent application Ser. No. 10/917,595, entitled "WIRELESS MAC LAYER THROUGHPUT IMPROVEMENTS" filed Aug. 12, 2004, now allowed, assigned to the assignee hereof and hereby expressly incorporated by reference in its entirety.

BACKGROUND OF THE INVENTION

As wireless networks become increasingly popular, there is an ever greater need to provide higher data throughput from existing bandwidth allocations. Typically, a wireless network must operate within an assigned band of frequencies. This is usually the case regardless of the type of physical transmission technique utilized. For example, frequency hopping systems usually must only hop to frequencies contained within a fixed range of frequencies. Similarly, spread spectrum systems must remain within the bounds of a well-defined, frequency band. Of course, frequency division multiplexing system, as well, are confined to fixed bandwidths. Thus, a fundamental performance goal in the implementation of wireless networks is to provide as much data throughput as possible given a particular bandwidth allocation. However, a wireless network typically has to utilize some sort of protocol to deal with problems associated with operating within a multi-access channel environment, in which more than one transmitter may transmit in the same channel at a particular time. For example, the well-known "hidden station" problem is associated with the fact that not all nodes in a wireless network are within radio range of one another. Thus, a node wishing to transmit to another node may not be able to detect that the a selected channel is occupied in the vicinity of the other node, such that a packet transmitted to the other node on the selected channel is unlikely to be received successfully by the other node. Another problem may simply be that noise in the channel causes sufficient bit errors for a particular transmission such that the other node cannot properly receive the transmission. Thus, it is usually not possible for the transmitter to know for certain the success of the communication by simply "listening" to the selected channel for its own transmission. The fact that the transmitter may be able to successfully receive its own transmission is no guarantee that the intended receiver will be able to do the same.

FIG. 1 depicts an illustrative wireless network 100. The wireless network 100 includes an access point (AP) 102 and stations (STAs) 104 and 106. Typically, wireless networks may include numerous APs and STAs, but the simplified wireless network 100 is shown in here for illustrative purposes. Each of the three nodes, AP 102, STA 104, and STA 106, must be able to both transmit and receive packets over the wireless medium. Different types of communication may be possible. For example, in one arrangement, all communication may be required to go through AP 102. Thus, if STA 104 wishes to transmit a packet to STA 106, the transmission must first be sent to AP 102, then relayed to STA 106. In another arrangement, STA 104 may communicate directly with STA 106, without involving AP 102. Regardless of the type of communication chosen, a fundamental component is a transmission that involves one node (AP or STA) acting as the transmitter and another node (AP or STA) acting as the receiver of the transmission. As mentioned, the wireless environment is such that the transmitter usually cannot tell, by "listening" for its own transmission, whether the transmission it sends has been properly received by the intended receiver. To deal these and other effects, a multi-access protocol for a wireless network typically must provide techniques that handle situations where transmissions are not properly received. One such technique that has been widely adopted is the use of an acknowledgement packet.

FIG. 2 illustrates a known approach for sending a number of data packets from a transmitter A, each followed by an acknowledgement packet from a receiver B. As shown in the figure, data packet 202 is sent from transmitter A, intended for receiver B. If receiver B properly receives data packet 202, it sends an acknowledgement packet 204 back to transmitter A to acknowledge proper receipt of data packet 202. In this manner, transmitter A is provided with feedback on the success of its transmission and can react accordingly. For example, each receiver that does properly receive a data packet may be required to send an acknowledgement to the sender within a specified amount of time. Thus, transmitter A may be able measure the time elapsed since it sent data packet 202. If transmitter A does not receive an acknowledge packet from receiver B within the specified amount of time receiver B is required to provide such acknowledgement, taking into account propagation and processing delays, transmitter A may be able to conclude that the transmission failed and react appropriately, such as initiate re-transmission of the data packet. As shown in FIG. 2, transmitter A may send another data packet 206 to receiver B, which may then respond with an acknowledgement packet 208. Similarly, transmitter A may send a data packet 210, to which receiver B may respond with an acknowledgement packet 212. Thus, this approach involves the receiver sending an acknowledgement packet for each data packet it receives from the transmitter.

FIG. 3 illustrates a known approach for sending a burst of data packets from a transmitter A, followed by one acknowledgement packet from a receiver B for providing acknowledgement information with regard to all of the data packets in the burst. As shown, transmitter A sends data packets 302 and 304 and an acknowledgement request packet 306. FIG. 3 shows that data packets in the burst are separated by a Short Interframe Spacing (SIFS) defined for the standard physical layer wireless protocol used by transmitter A and receiver B. Within a particular standard physical layer protocol, SIFS may specify the separation needed between a data packet and an acknowledgement packet, as well as the separation needed between consecutive packets sent from a transmitter. Different standard physical layer protocols may define different values for SIFS. For example, if transmitter A and receiver B utilize an 802.11a physical layer protocol, transmitter A and receiver B may be capable of sending and receiving packets separated by a SIFS defined to be 16 μsec. As another example, if transmitter A and receiver B utilize an 802.11b physical layer protocol, transmitter A and receiver B may be capable of transmitting and receiving packets separated by a SIFS defined to be 10 μsec.

Referring back to FIG. 3, receiver B responds to the acknowledgement request packet 306 by sending an acknowledgement packet 308, which provides acknowledgement for both data packets 302 and 304, as to whether each packet has been successfully received. Acknowledgement packet 308 is often referred to as "burst ack" or "group ack" because it provides acknowledgement information for more than one data packet. Generally, acknowledgement packet 308 provides a bit map that utilizes a bit to represent acknowledgement information for each data packet in the burst. Thus, transmitter A may send a burst of many data packets. In response, receiver B would send an acknowledgement that includes a bit map, with each bit indicating either successful or unsuccessful reception of a corresponding data packet in the burst.

While the use of "burst ack" has resulted in improvements to data throughput by reducing the number of acknowledgement packets that must be sent for a burst of data packets, such improvements have approached a fundamental limit. That is, further improvements to data throughput have become exceedingly difficult to achieve given that necessary protocol functions must still be carried out, and data throughput performance of wireless networks for any given allotment of bandwidth appears to have "plateaued." Yet demand for greater data throughput continues to increase as available bandwidth remains limited. Thus, there is a tremendous need for breaking what seems to be an upper bound for data throughput in wireless networks to achieve even better data throughput performance.

BRIEF SUMMARY OF THE INVENTION

The present invention relates to methods, apparatuses, and systems for transmitting data packets in a wireless network over a multi-access channel involving sequentially sending a plurality of medium access control (MAC) data packets from a transmitter over the multi-access channel, using a physical layer protocol based on a standard physical layer protocol having a short interframe spacing (SIFS), wherein the plurality of MAC data packets includes at least a first data packet and a second data packet separated by a reduced interframe spacing that is less than SIFS, attempting to receive the plurality of MAC data packets at a receiver using the physical layer protocol, including the first data packet and the second data packet separated by the reduced interframe spacing, and sending from the receiver a single acknowledgement packet associated with attempting to receive the plurality of MAC data packets.

In one embodiment of the invention, the single acknowledgement packet contains packet receipt status information to identify a first successfully received packet and a last successfully received packet from the plurality of MAC data packets, wherein the first successfully received packet and the last successfully received packet may be separately identified by distinct sequence numbers provided in the single acknowledgement packet. The reduced interframe spacing may be adjustable within a range between zero and SIFS. The reduced interframe spacing may also be automatically adjustable depending on identity of the receiver. Further, the wireless network may utilize an 802.11-based physical layer protocol.

In another embodiment of the invention, at least a first and a second mode of operation may be possible, wherein the first mode of operation involves the mentioned steps for sequentially sending the plurality of MAC data packets, attempting to receive the plurality of MAC data packets, and sending the single acknowledgement packet, and wherein the second mode of operation involves, from the transmitter, sequentially sending a second plurality of MAC data packets over the multi-access channel, wherein the second plurality of MAC data packets includes at least a first data packet and a second data packet separated by a reduced interframe spacing that is less than SIFS, at the receiver, attempting to receive the second plurality of MAC data packets, including the first data packet and the second data packet separated by the second reduced interframe spacing, without sending from the receiver an acknowledgement packet associated with the attempt to receive the second plurality of data packets.

In yet another embodiment of the invention, a third mode of operation may be possible involving, from the transmitter, sequentially sending a third plurality of MAC data packets over the multi-access channel, wherein the third plurality of MAC data packets includes at least a first data packet and a second data packet separated by SIFS, at the receiver, attempting to receive the third plurality of MAC data packets, including the first data packet and the second data packet separated by SIFS, and sending from the receiver a single acknowledgement packet associated with the attempt to receive the third plurality of MAC data packets.

In addition, the reduced interframe spacing may be dynamically adjustable based on which mode of operation is selected.

DETAILED DESCRIPTION OF THE INVENTION

Figure 1:
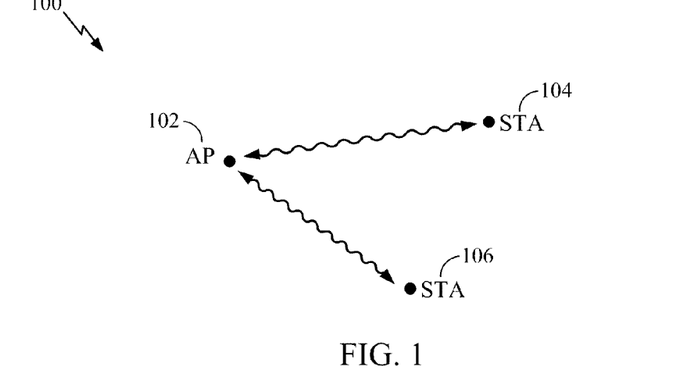
FIG. 1 depicts an illustrative wireless network.
Figure 2:
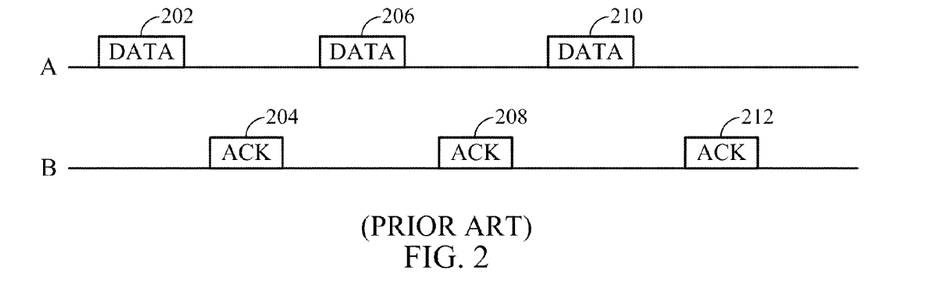
FIG. 2 illustrates a known approach for sending a burst of data packets from a transmitter A, each followed by an acknowledgement packet from a receiver B.
Figure 3:
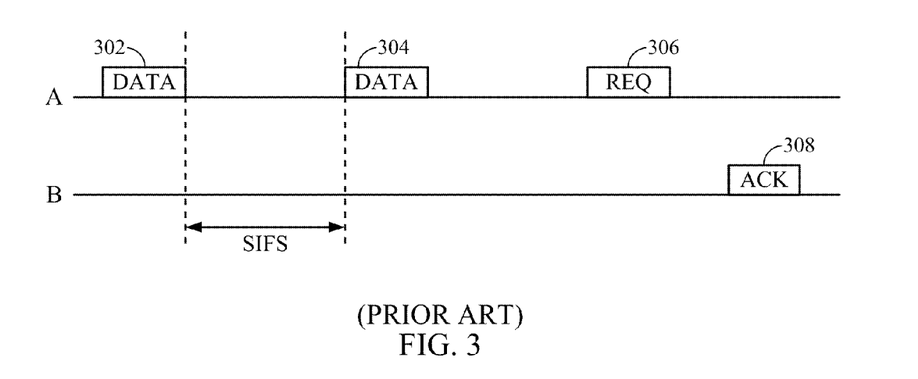
FIG. 3 illustrates a known approach for sending a burst of data packets from a transmitter A, followed by one acknowledgement packet from a receiver B for providing acknowledgement information with regard to all data packets in the burst.
Figure 4:
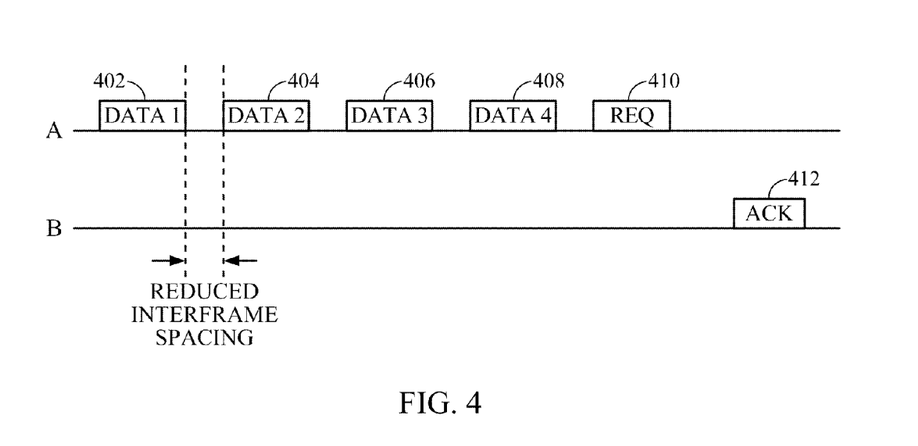
FIG. 4 illustrates an approach for sending a burst of data packets separated by a reduced interframe spacing from a transmitter A, followed by a single acknowledgement packet from a receiver B for providing acknowledgement information with regard to the attempt to receive data packets in the burst, in accordance with one embodiment of the present invention.

FIG. 4 illustrates an approach for sending a burst of data packets separated by a reduced interframe spacing from a transmitter A, followed by a single acknowledgement packet from a receiver B for providing acknowledgement information with regard to the attempt to receive data packets in the burst, in accordance with one embodiment of the present invention. Transmitter A operates in accordance with a physical layer protocol that is based on a standard physical layer wireless protocol having a defined SIFS. For example, transmitter A may operate according to a physical layer protocol that is based on the standard 802.11a physical layer wireless protocol, which may have a defined SIFS of 16 μsec. The physical layer protocol used may be quite similar to the standard physical layer protocol on which it is based. However, the physical layer protocol allows for transmission and receipt of data packets separated by a reduced interframe spacing that is less than the SIFS defined for the standard physical layer protocol. The physical layer protocol may be based on different standard physical layer wireless protocols, including various 802.11-based physical layer protocols such as 802.11 infrared, 802.11 frequency hopping spread spectrum (FHSS), 802.11a orthogonal frequency division multiplexing (OFDM), 802.11b high rate direct sequence spread spectrum (HR-DSSS), 802.11g OFDM, and others. Referring back to FIG. 4, transmitter A sequentially sends data packets 402, 404, 406, and 408, with consecutive data packets separated by a reduced interframe spacing that is less than the SIFS defined for the standard physical layer wireless protocol. At the end of the burst of data packets, transmitter A sends an acknowledgement request packet 410 to request that an acknowledgement packet be sent back to transmitter A. The acknowledgement request packet may be separate from the last data packet in the burst by the reduced interframe spacing.

Figure 5:
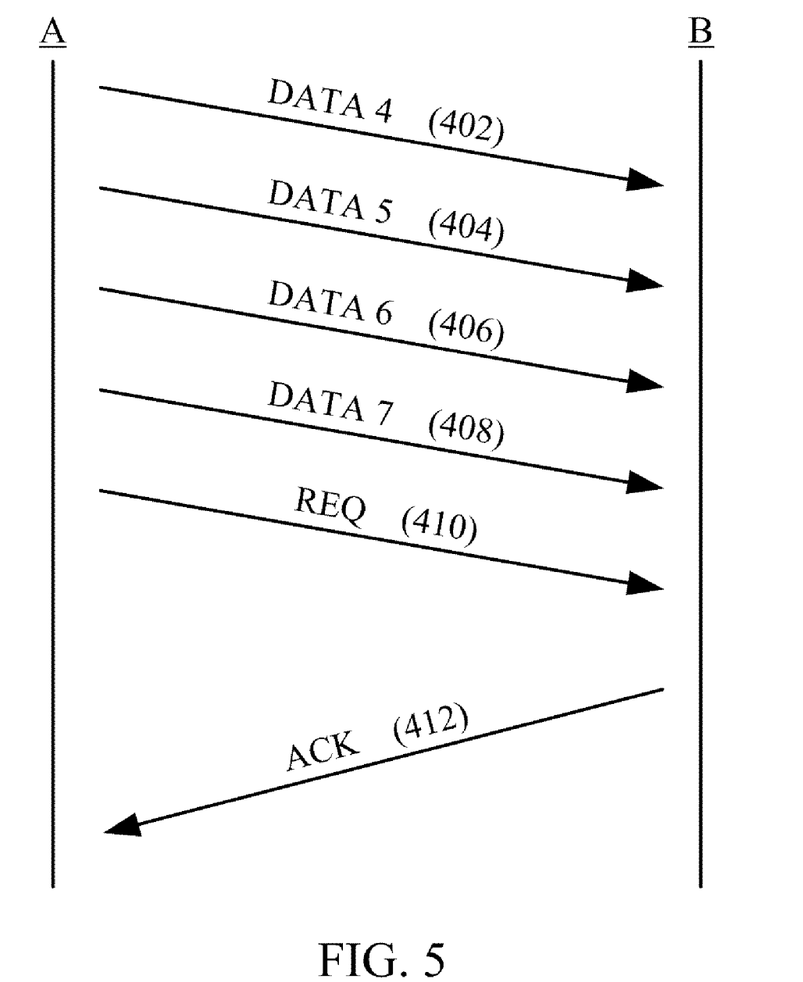
FIG. 5 is a diagram showing the transmission of the data packets and the acknowledgement request packet from transmitter A to receiver B and the transmission of the acknowledgement packet from receiver B to transmitter A, as discussed with respect to FIG. 4.

FIG. 5 is a diagram showing the transmission of the data packets and the acknowledgement request packet from transmitter A to receiver B and the transmission of the acknowledgement packet from receiver B to transmitter A, as discussed with respect to FIG. 4. In accordance with the present embodiment of the invention, transmitter A is capable of sending data packets 402, 406, 408, and 410, as well as acknowledgement request packet 412 in quick succession, separated by the reduced interframe spacing, which is less than the SIFS that may otherwise be utilized by transmitter A and receiver B. Receiver B is capable of receiving data packets 402, 406, 408, and 410, as well as acknowledgement request packet 412, spaced in this manner. Furthermore, receiver B is capable of receiving these packets and responding by generating and sending an acknowledgement packet 412 within a specified time limit. This presents a significant challenge to receiver B, which typically must receive the data packets and acknowledgement request packet in receive mode, determine the outcome of the attempt to properly receive each of the incoming packets, generate an appropriate acknowledgement packet associated with such outcome, and convert to transmit mode to send out the acknowledgement packet. Receiver B must complete all these steps within a specified time limit. The innovative adoption of a reduced interframe spacing in accordance with the present embodiment of the invention increases data throughput by compacting data packets closer together than is allowed by existing MAC protocols, which require a minimum separation of SIFS. However, use of the reduced interframe spacing means that receiver B has even less time to perform all of its necessary tasks and send out the appropriate acknowledgement packet within the specified time limit. As described in further detail below, the present embodiment of the invention nevertheless adopts the use of a reduced interframe spacing and illustrates techniques for overcoming such timing and processing challenges.

Figure 6:
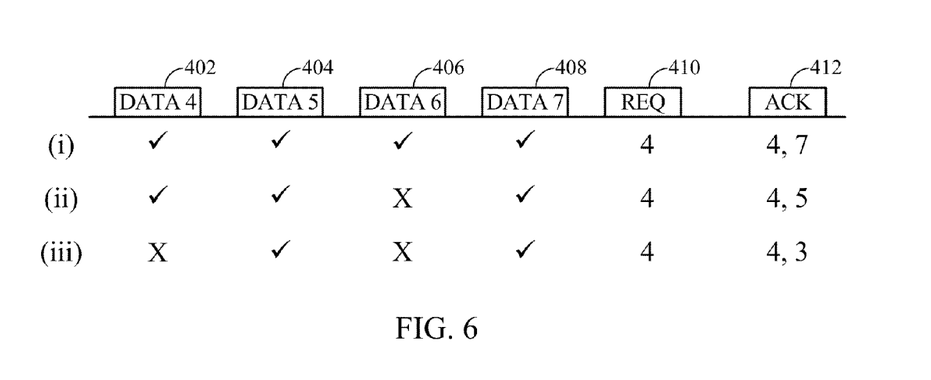
FIG. 6 demonstrates three different scenarios for receiving the data packets and acknowledgement request packet shown in FIG. 4 and generating appropriate acknowledgement packet information, in accordance with one embodiment of the present invention.

FIG. 6 demonstrates three different scenarios for receiving the data packets and acknowledgement request packet shown in FIG. 4 and generating appropriate acknowledgement packet information, in accordance with one embodiment of the present invention. Here, the transmission of the data packets, acknowledgement request packet, and acknowledgement packet are all shown on a common line. However, it should be understood that the data packets and acknowledgement request packet are sent from transmitter A, and the acknowledgement packet is sent from receiver B, as previously discussed. As shown in the figure, for each of the three different illustrative scenarios (i), (ii), and (iii), a check mark ("√") indicates successful reception of the respective data packet, and an x mark ("x") indicates unsuccessful reception of the respective data packet. A "successful" reception may be defined in different ways, as understood by one of ordinary skill in the relevant art. For example, if a particular packet is received and a cyclic redundancy check (CRC) performed does not indicate any error, the packet may be considered to have been received successfully. Of course, other definitions may be employed.

For scenario (i), it is shown that all data packets 402, 404, 406, and 408 have been received successfully. Here, each of the data packets contains a distinct sequence number that distinguishes it from other data packets in this burst of data packets. For purposes of illustrations, data packets 402, 404, 406, and 408 are shown to have sequence numbers 4, 5, 6, and 7, respectively. Continuing with scenario (i), the acknowledgement request packet 410 identifies the sequence number "4" as the leading data packet in the burst of data packets sent. In response to receiving all of the data packets 402, 404, 406, and 408 successfully, the receiver sends an acknowledgement packet 412 that identifies the sequence numbers "4" and "7" to indicate the beginning and the end of a contiguous block of successfully received data packets that begins with the leading data packet.

For scenario (ii), FIG. 6 shows that data packets 402, 404, and 408 are successfully received. However, data packet 406 is not successfully received. Here, the acknowledgement packet 412 identifies the sequence numbers "4" and "5," which correspond to data packets 402 and 404, respectively. While data packet 408 is also shown to be received successfully, the acknowledgement packet 412 only identifies the beginning and end packets of a continuous block of successfully received data packets beginning with the leading data packet. For this scenario, this block includes only data packets 402 and 404. Thus, the acknowledgement packet identifies corresponding sequence numbers "4" and "5."

For scenario (iii), the figure shows that data packet 402 and 406 are not received successfully, while data packets 404 and 408 are received successfully. Here, there is no contiguous block of successfully received data packets that begins with the leading data packet 402. This is because the leading data packet 402 is not successfully received. In this case, the acknowledgement packet indicates the leading sequence number as "4" and the ending sequence number as "3" (leading sequence number−1), to indicate that there is no contiguous block of successfully received data packets beginning with the leading data packet.

The streamlined burst acknowledgement information illustrated in FIG. 6 lessens the burden on a receiver responsible for generating and sending an acknowledgement packet in response to a burst of data packets. Unlike previously implemented acknowledgement packets, the acknowledgement packet shown in FIG. 6 needs not keep track of the successful or unsuccessful reception of every data packet sent in succession from the transmitter, such as by inclusion of a bit map containing bits that provide a one-to-one correspondence to all such data packets. In accordance with the present embodiment of the invention, an acknowledgement packet may simply identify the beginning and end of a contiguous block of successfully received packets, thereby reducing the amount of processing the receiver must perform within a specified time limit.

Figure 7:
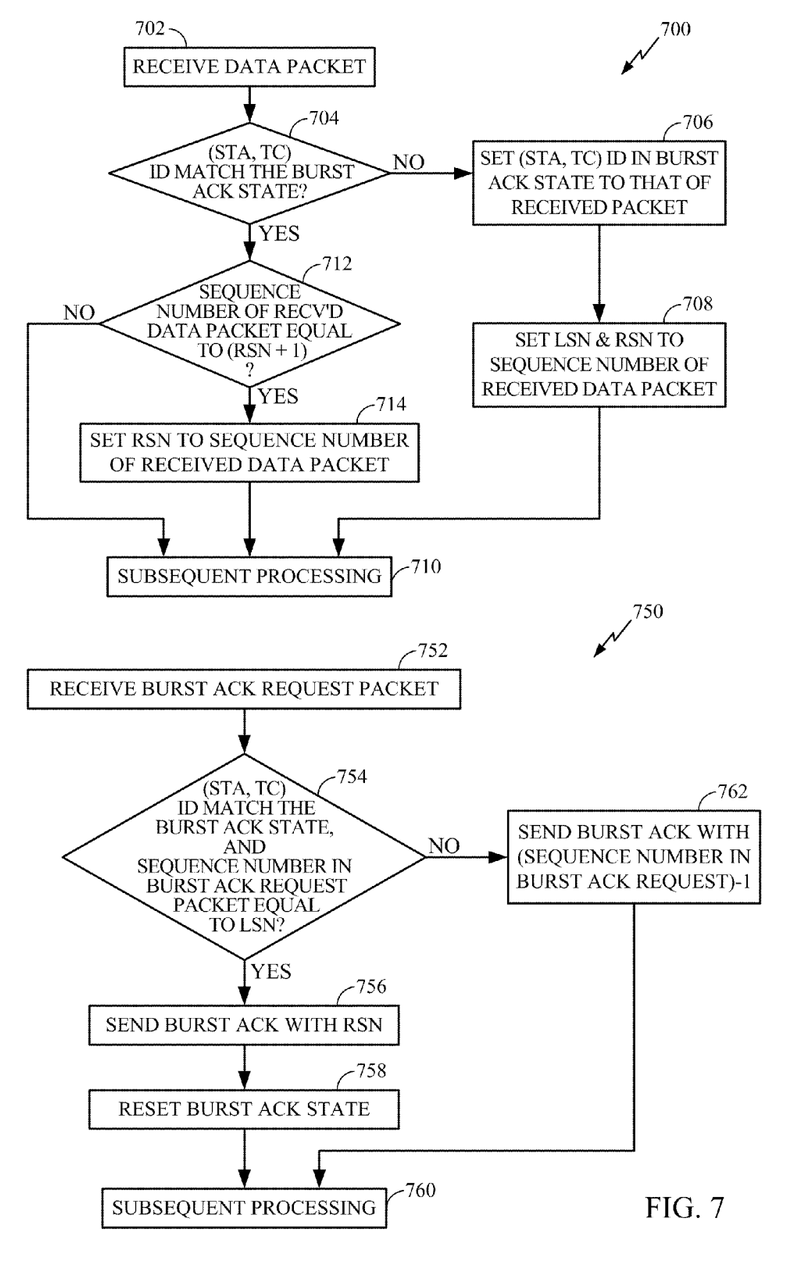
FIG. 7 is a flowchart outlining illustrative steps performed at a receiver for processing received data packets and processing received acknowledgement request packets, in accordance with one embodiment of the present invention.

FIG. 7 is a flowchart outlining illustrative steps performed at a receiver for processing received data packets and processing received acknowledgement request packets, in accordance with one embodiment of the present invention. Specifically, a sub-flowchart 700 provides steps for processing a received data packet, while a separate sub-flowchart 750 provides steps for processing a received acknowledgement request packet. According to the present embodiment of the invention, the receiver maintains a data structure, referred to here as a "burst ack state," containing the following fields:

STA id
TC id
LSN (left sequence number)
RSN (right sequence number)

The burst ack state is initially reset. In the present embodiment of the invention, this involves setting each field in the burst ack state to a value of "0." The STA id identifies the node from which the current received packet originates. The traffic category (TC) id identifies the traffic category of the current received data packet, when multiple traffic categories are applicable, such as when the present embodiment of the invention is used in a hybrid coordination function (HCF) system. Thus, the TC id may not be used when multiple traffic categories are not applicable. The LSN, or left sequence number, identifies the sequence number of the leading packet in a continuous block of successfully received data packets. In the present embodiment, the sequence number of the leading packet is identified in the acknowledgement request packet. The RSN, or right sequence number, identifies the sequence number of the ending packet in the continuous block of successfully received data packets.

In the present embodiment of the invention, one burst ack state is maintained in real time at each receiver, even if the there are multiple flows of data that are handled by the receiver at a particular time. The burst ack state is maintained in real time in the sense that the information in the burst ack state is closely updated in hardware to keep up with the burst currently being received. There may be other data structures maintained by the receiver that are not updated as closely, containing similar information and relating to other flows of data. In another embodiment of the invention, multiple burst ack states may be maintained in real time at a receiver to correspond to multiple active flows of data handled by the receiver.

Furthermore, in accordance with one embodiment of the present invention, a transmitter may use different values of reduced interframe spacing to transmit packets to different receivers. The various receivers may have different capabilities such that one receiver may be capable of receiving packets separated by a particular value of reduced interframe spacing, while another receiver is capable of receiving packets separated by another value of reduced interframe spacing. Thus, the transmitter may be configured to automatically adjust the value of the reduced interframe spacing used in transmitting packets, depending on which receiver is to receive the transmitted packets. For example, the transmitter may perform a look-up based on the identity of the receiver, in order to apply the appropriate reduced interframe spacing value.

In sub-flowchart 700, a data packet is received at step 702. At step 704, the STA id and the TC id of the received data packet are examined to see if they match those in the burst ack state. If not, at step 706, the STA id and TC id in the burst ack state are set to the those of the received data packet. Following step 706, in step 708, the LSN and RSN in the burst ack state are set to the sequence number of the received data packet.

Following step 708, in step 710, subsequent processing may be performed. If at step 704, the STA id and the TC id of the of the received data packet match those of the burst ack state, at step 712, the sequence number of the received data packet is examined. If the sequence number of the received data packet is equal to (RSN+1), the process moves to step 714, where the RSN is set to that sequence number. Else, the process moves to step 710, where subsequent processing may be performed.

In sub-flowchart 750, a burst acknowledgement request packet is received at step 752. Next, at step 754, a determination is made whether (1) the STA id and the TC id of the received burst acknowledgement request packet match those in the burst ack state and (2) the sequence number identified in the received burst acknowledgement request packet equals LSN. If both (1) and (2) are true, then at a step 756, a burst acknowledgement packet is sent identifying the current value of RSN. In an alternative embodiment, the burst acknowledgement packet may identify, in addition, the sequence number identified in the received burst acknowledgement request packet, in a manner similar to that shown in FIG. 6. Following step 756, in step 758, the burst ack state is reset. Following step 758, at step 760, subsequent processing may be performed. If at step 754, it is found that (1) and (2) are not both true, then at a step 762, a burst acknowledgement packet is sent identifying a number equal to the sequence number (identified in the received burst acknowledgement request packet) minus one. Again in an alternative embodiment, the burst acknowledgement packet may additionally identify the sequence number identified in the received burst acknowledgement request packet, in a manner similar to that shown in FIG. 6.

Figure 8:
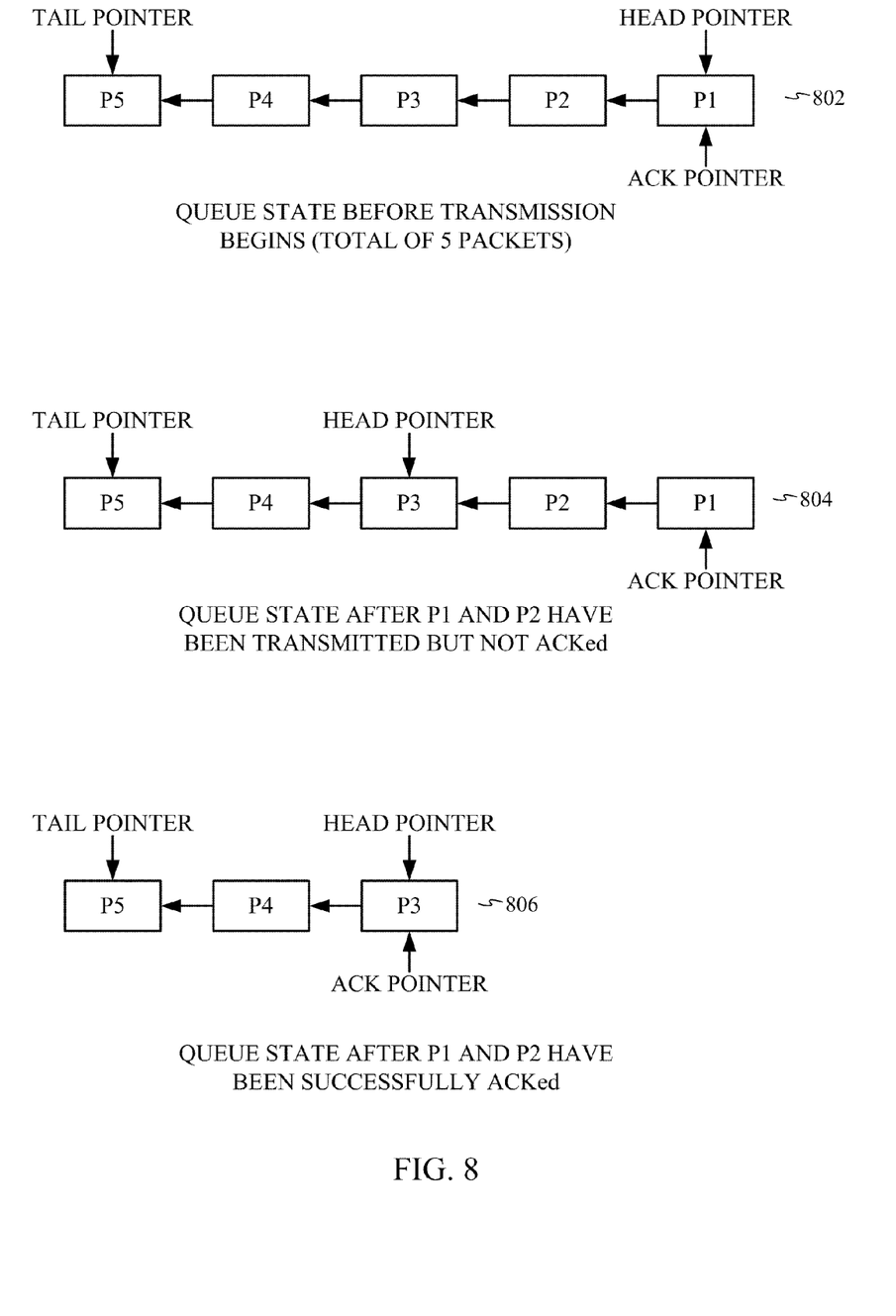
FIG. 8 illustrates a queueing structure and the various queue states as packets are transmitted in a burst ack mode according to one embodiment of the invention.

FIG. 8 illustrates a queuing structure and the various queue states as packets are transmitted in a burst acknowledgement mode according to one embodiment of the invention. Here, the transmitter maintains a head pointer, an acknowledgement pointer (ack pointer), and a tail pointer pointing to appropriate locations within a queuing structure containing representations of data packets sent by the transmitter. The head pointer points to the next packet in the queue which is due to be transmitted. The ack pointer points to the oldest unacknowledged packet in the queue. The tail pointer points to the last packet in the current burst of packets to be transmitted. As shown, queue state 802 represents a queue state before transmission begins for a burst of 5 packets labeled as P1 through P5. Queue state 804 represents the queue state after packets P1 and P2 have been transmitted, but not yet acknowledged. Queue state 806 represents the queue state after packets P1 and P2 have been successfully acknowledged. As data packets are sent by the transmitter and acknowledged, the head pointer and acknowledgement pointer move along in the queuing structure to keep track of which data packets sent by the transmitter have been properly acknowledged by the intended receiver.

Figure 9:
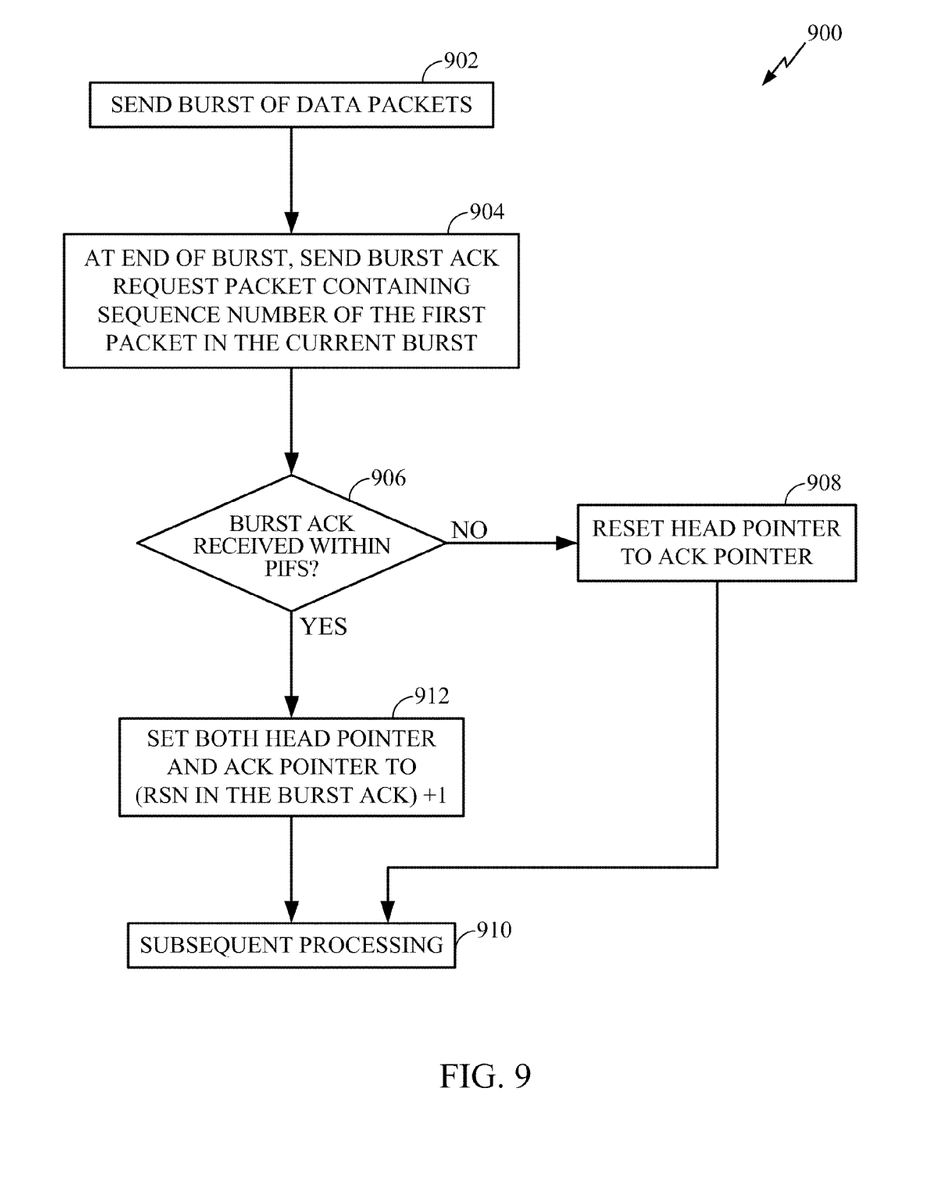
FIG. 9 is a flowchart outlining illustrative steps performed at a transmitter associated with sending an acknowledgement request packet following a burst of data packets, in accordance with one embodiment of the invention.

FIG. 9 is a flowchart 900 outlining illustrative steps performed at a transmitter associated with sending an acknowledgement request packet following a burst of data packets, in accordance with one embodiment of the invention. At step 902, a burst of data packets are sequentially sent from the transmitter. In step 904, at the end of the burst, a burst acknowledgement request packet is sent from the transmitter. The burst acknowledgement request packet identifies the sequence number of the first packet in the burst of data packets sent at step 902. Next, at step 906, it is determined whether a corresponding burst acknowledgement packet is received from a receiver within a specified amount of time, for example, within a defined point coordination function interframe spacing (PIFS). If not, at step 908, the head pointer is set to the ack pointer, and at step 910, subsequent processing may be performed. If so, at step 912, both the head pointer and the ack pointer are set to a value equal to the RSN value found in the received burst acknowledgement packet from the receiver, plus one. Next, in step 910, subsequent processing may be performed.

Figure 10:
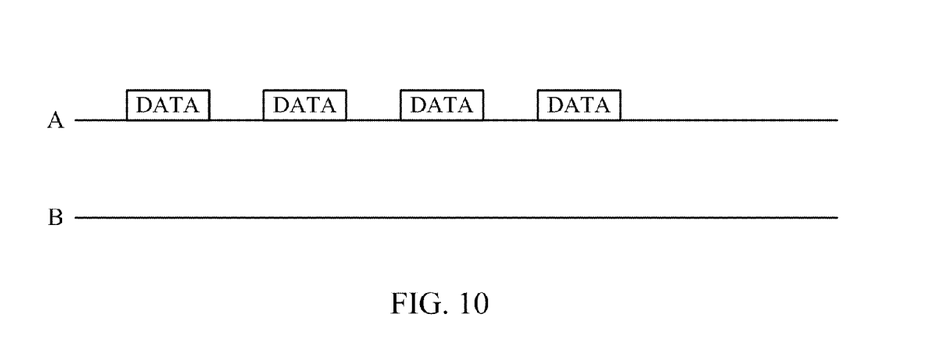
FIG. 10 illustrates an approach for sending a burst of data packets separated by a reduced interframe spacing from a transmitter A, without any acknowledgement packet from a receiver B that receives the burst of data packets.

According to one embodiment of the invention, the transmitter and receiver operate together in a number of different modes of operation. For example, there may be three modes of operation:
1. Burst ack with reduced interframe spacing
2. No ack with reduced interframe spacing
3. Burst ack with SIFS In the first mode of operation, the transmitter may send a burst of data packets separated by a reduced interframe spacing, and the receiver may send a burst acknowledgement packet in response, as previously described. In a second mode of operation, the transmitter may send a burst of data packet separated by a reduced interframe spacing, and the receiver may not send a burst acknowledgement packet in response. This mode may be useful in media application, such as voice and video, in which lossy transmission is acceptable and re-transmission of data may not be necessary. FIG. 10 illustrates an approach for sending a burst of data packets separated by a reduced interframe spacing from a transmitter A, without any acknowledgement packet from a receiver B that receives the burst of data packets. In a third mode of operation, the transmitter may send a burst of data packets separated by SIFS, and the receiver may send a burst acknowledgement packet in response, in accordance with existing protocol standards.

Figure 11:
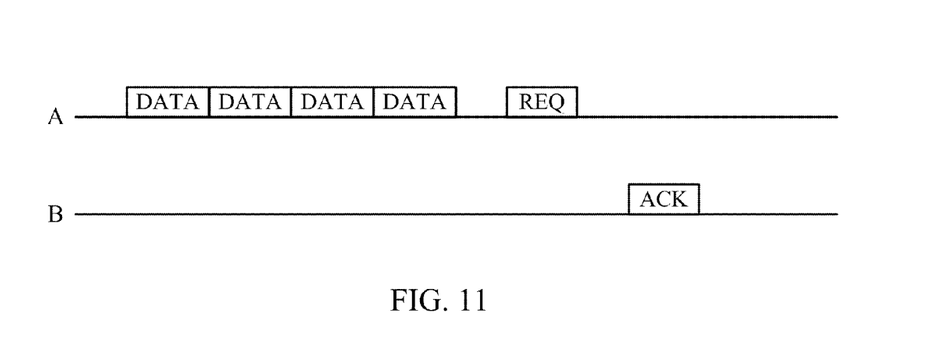
FIG. 11 illustrates an approach for sending a burst of data packets separated by a reduced interframe spacing that has been adjusted to zero from a transmitter A, followed by a single acknowledgement packet from a receiver B for providing acknowledgement information with regard to the attempt to receive data packets in the burst, in accordance with one embodiment of the present invention.

In a preferred embodiment of the present invention, the reduced interframe spacing may be dynamically adjustable between zero and SIFS. FIG. 11 illustrates an approach for sending a burst of data packets separated by a reduced interframe spacing that has been adjusted to zero from a transmitter A, followed by a single acknowledgement packet from a receiver B for providing acknowledgement information with regard to the attempt to receive data packets in the burst, in accordance with one embodiment of the present invention. The dynamically adjustable reduced interframe spacing may be utilized in a variety of ways. For example, a particular reduced interframe spacing may be used in connection with the first mode of operation in which the transmitter sends a burst of data packets separated by the reduced interframe spacing, and the receiver sends a burst acknowledgement packet in response. However, the reduced interframe spacing may dynamically change to a different value upon switching to the second mode of operation in which the transmitter sends a burst of data packets separated by the reduced interframe spacing and the receiver does not send any burst acknowledgement packet in response.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for transmitting data packets in a wireless network over a multi-access channel comprising:
   sequentially sending a plurality of medium access control (MAC) data packets from a transmitter over the multi-access channel, using a physical layer protocol based on a standard physical layer protocol having a short interframe spacing (SIFS), wherein the plurality of MAC data packets includes at least a first data packet and a second data packet separated by a reduced interframe spacing that is less than SIFS;
   attempting to receive the plurality of MAC data packets at a receiver using the physical layer protocol, including the first data packet and the second data packet separated by the reduced interframe spacing; and
   sending from the receiver a single acknowledgement packet associated with attempting to receive the plurality of MAC data packets, wherein the single acknowledgement packet contains a first sequence number and a second sequence number to identify a leading MAC data packet and an ending MAC data packet, respectively, of a continuous block of the plurality of MAC data packets that is successfully received.

2. The method of claim 1 wherein the single acknowledgement packet contains packet receipt status information for less than all of the plurality of the MAC data packets.

3. The method of claim 1 wherein the reduced interframe spacing is adjustable within a range between zero and SIFS.

4. The method of claim 3 wherein the reduced interframe spacing is automatically adjustable depending on identity of the receiver.

5. The method of claim 1 wherein the wireless network utilizes an 802.11-based physical layer protocol.

6. The method of claim 1 wherein the method is associated with at least a first and a second mode of operation, wherein the first mode of operation involves said steps for sequentially sending the plurality of MAC data packets, attempting to receive the plurality of MAC data packets, and sending the single acknowledgement packet, and wherein the second mode of operation involves the steps of:
   from the transmitter, sequentially sending a second plurality of MAC data packets over the multi-access channel, wherein the second plurality of MAC data packets includes at least a first data packet and a second data packet separated by a reduced interframe spacing that is less than SIFS;
   at the receiver, attempting to receive the second plurality of MAC data packets, including the first data packet and the second data packet separated by the second reduced interframe spacing, without sending from the receiver an acknowledgement packet associated with the attempt to receive the second plurality of data packets.

7. The method of claim 6 wherein the method is further associated with a third mode of operation involving the steps of:
   from the transmitter, sequentially sending a third plurality of MAC data packets over the multi-access channel, wherein the third plurality of MAC data packets includes at least a first data packet and a second data packet separated by SIFS;
   at the receiver, attempting to receive the third plurality of MAC data packets, including the first data packet and the second data packet separated by SIFS; and
   sending from the receiver a single acknowledgement packet associated with the attempt to receive the third plurality of MAC data packets.

8. The method of claim 6 wherein the reduced interframe spacing is dynamically adjustable based on which mode of operation is selected.

9. An apparatus for transmitting data packets in a wireless network over a multi-access channel comprising:

a transmitter capable of sending packets separated by short interframe spacing (SIFS), the transmitter further capable of sequentially sending a plurality of medium access control (MAC) data packets over the multi-access channel, wherein the plurality of MAC data packets includes at least a first data packet and a second data packet separated by a reduced interframe spacing that is less than SIFS; and a receiver capable of receiving packets separated by SIFS, the receiver further capable of attempting to receive the plurality of MAC data packets, including the first data packet and the second data packet separated by the reduced interframe spacing, wherein the receiver is further capable of sending a single acknowledgement packet associated with the attempt to receive the plurality of MAC data packets, wherein the single acknowledgement packet contains a first sequence number and a second sequence number to identify a leading MAC data packet and an ending MAC data packet, respectively, of a continuous block of the plurality of MAC data packets that is successfully received.

10. The apparatus of claim 9 wherein the single acknowledgement packet contains packet receipt status information for less than all of the plurality of the MAC data packets.

11. The apparatus of claim 9 wherein the reduced interframe spacing is adjustable within a range between zero and SIFS.

12. The apparatus of claim 11 wherein the reduced interframe spacing is automatically adjustable depending on identity of the receiver.

13. The apparatus of claim 9 wherein the wireless network utilizes an 802.11-based physical layer protocol.

14. The apparatus of claim 9 wherein the apparatus is associated with at least a first and a second mode of operation, wherein in the first mode of operation, the transmitter is capable of sequentially sending the plurality of MAC data packets, and the receiver is capable of attempting to receive the plurality of MAC data packets and sending the single acknowledgement packet, wherein the second mode of operation, the transmitter is further capable of sequentially sending a second plurality of MAC data packets over the multi-access channel, wherein the second plurality of MAC data packets includes at least a first data packet and a second data packet separated by a reduced interframe spacing that is less than SIFS, and wherein in the second mode of operation, the receiver is further capable of attempting to receive the second plurality of MAC data packets, including the first data packet and the second data packet separated by the second reduced interframe spacing, without sending an acknowledgement packet associated with the attempt to receive the second plurality of data packets.

15. The apparatus of claim 14 wherein the apparatus is further associated with a third mode of operation, wherein in the third mode of operation, the transmitter is capable of sequentially sending a third plurality of MAC data packets over the multi-access channel, wherein the third plurality of MAC data packets includes at least a first data packet and a second data packet separated by SIFS, wherein in the third mode of operation, the receiver is capable of attempting to receive the third plurality of MAC data packets, including the first data packet and the second data packet separated by SIFS, and sending a single acknowledgement packet associated with the attempt to receive the third plurality of MAC data packets.

16. The apparatus of claim 14 wherein the reduced interframe spacing is dynamically adjustable based on which mode of operation is selected.

17. A system for transmitting data packets in a wireless network over a multi-access channel comprising:

means for sequentially sending a plurality of medium access control (MAC) data packets from a transmitter over the multi-access channel, using a physical layer protocol based on a standard physical layer protocol having a short interframe spacing (SIFS), wherein the plurality of MAC data packets includes at least a first data packet and a second data packet separated by a reduced interframe spacing that is less than SIFS;

means for attempting to receive the plurality of MAC data packets at a receiver using the physical layer protocol, including the first data packet and the second data packet separated by the reduced interframe spacing; and means for sending from the receiver a single acknowledgement packet associated with attempting to receive the plurality of MAC data packets, wherein the single acknowledgement packet contains a first sequence number and a second sequence number to identify a leading MAC data packet and an ending MAC data packet, respectively, of a continuous block of the plurality of MAC data packets that is successfully received.

18. The system of claim 17 wherein the single acknowledgement packet contains packet receipt status information for less than all of the plurality of the MAC data packets.

19. The system of claim 17 wherein the reduced interframe spacing is adjustable within a range between zero and SIFS.

20. The system of claim 17 wherein the wireless network utilizes an 802.11-based physical layer protocol.

21. A non-transitory processor-readable medium including processor-executable instructions for performing a method for transmitting data packets in a wireless network over a multi-access channel, the method comprising the steps of:

sequentially sending a plurality of medium access control (MAC) data packets from a transmitter over the multi-access channel, using a physical layer protocol based on a standard physical layer protocol having a short interframe spacing (SIFS), wherein the plurality of MAC data packets includes at least a first data packet and a second data packet separated by a reduced interframe spacing that is less than SIFS;

attempting to receive the plurality of MAC data packets at a receiver using the physical layer protocol, including the first data packet and the second data packet separated by the reduced interframe spacing; and sending from the receiver a single acknowledgement packet associated with attempting to receive the plurality of MAC data packets, wherein the single acknowledgement packet contains a first sequence number and a second sequence number to identify a leading MAC data packet and an ending MAC data packet, respectively, of a continuous block of the plurality of MAC data packets that is successfully received.

22. The non-transitory processor-readable medium of claim 21 wherein the single acknowledgement packet contains packet receipt status information for less than all of the plurality of the MAC data packets.

23. The non-transitory processor-readable medium of claim 21 wherein the reduced interframe spacing is adjustable within a range between zero and SIFS.

24. The non-transitory processor-readable medium of claim 21 wherein the wireless network utilizes an 802.11-based physical layer protocol.

* * * * *